Sept. 3, 1957

P. A. COFFMAN, JR 2,805,036

CONTINUOUS FEEDER

Filed Jan. 27, 1956

4 Sheets-Sheet 1

*INVENTOR.*
PAUL A. COFFMAN, JR.
BY
*Barlow & Barlow*
ATTORNEYS

Sept. 3, 1957 P. A. COFFMAN, JR 2,805,036
CONTINUOUS FEEDER
Filed Jan. 27, 1956 4 Sheets-Sheet 2

INVENTOR.
PAUL A. COFFMAN, JR.
BY
Barlow & Barlow
ATTORNEYS

United States Patent Office 2,805,036
Patented Sept. 3, 1957

2,805,036
CONTINUOUS FEEDER

Paul A. Coffman, Jr., Warwick, R. I., assignor to B-I-F Industries, Inc., a corporation of Rhode Island Application January 27, 1956, Serial No. 561,892

17 Claims. (Cl. 249—26)

This invention relates to apparatus for continuously feeding material which may be liquid, granular, or powdered and is a continuation in part of my applications Serial No. 338,050, filed February 20, 1953, and Serial No. 369,104, filed July 20, 1953, now both abandoned.

One object of the present improvements is to provide a weighing feeder type of apparatus which comprises two containers from one of which the material is discharged while the other is being charged, and automatic control means responsive to the near emptying of the discharging container to cause the discharging action to be shifted from it to the now charged container and to charge the near emptied one.

Another object is to provide a weighing feeder type of apparatus which can feed material continuously at substantially constant, predetermined rates.

And still another object is to provide a weighing feeder type of apparatus which continuously indicates the weight of that material which has been discharged.

The principle of my invention is shown in the accompanying drawings, but this is to be deemed primarily illustrative because it is intended that the patent shall cover by suitable expression in the appended claims whatever features of patentable novelty exist in the invention disclosed.

Figure 1:
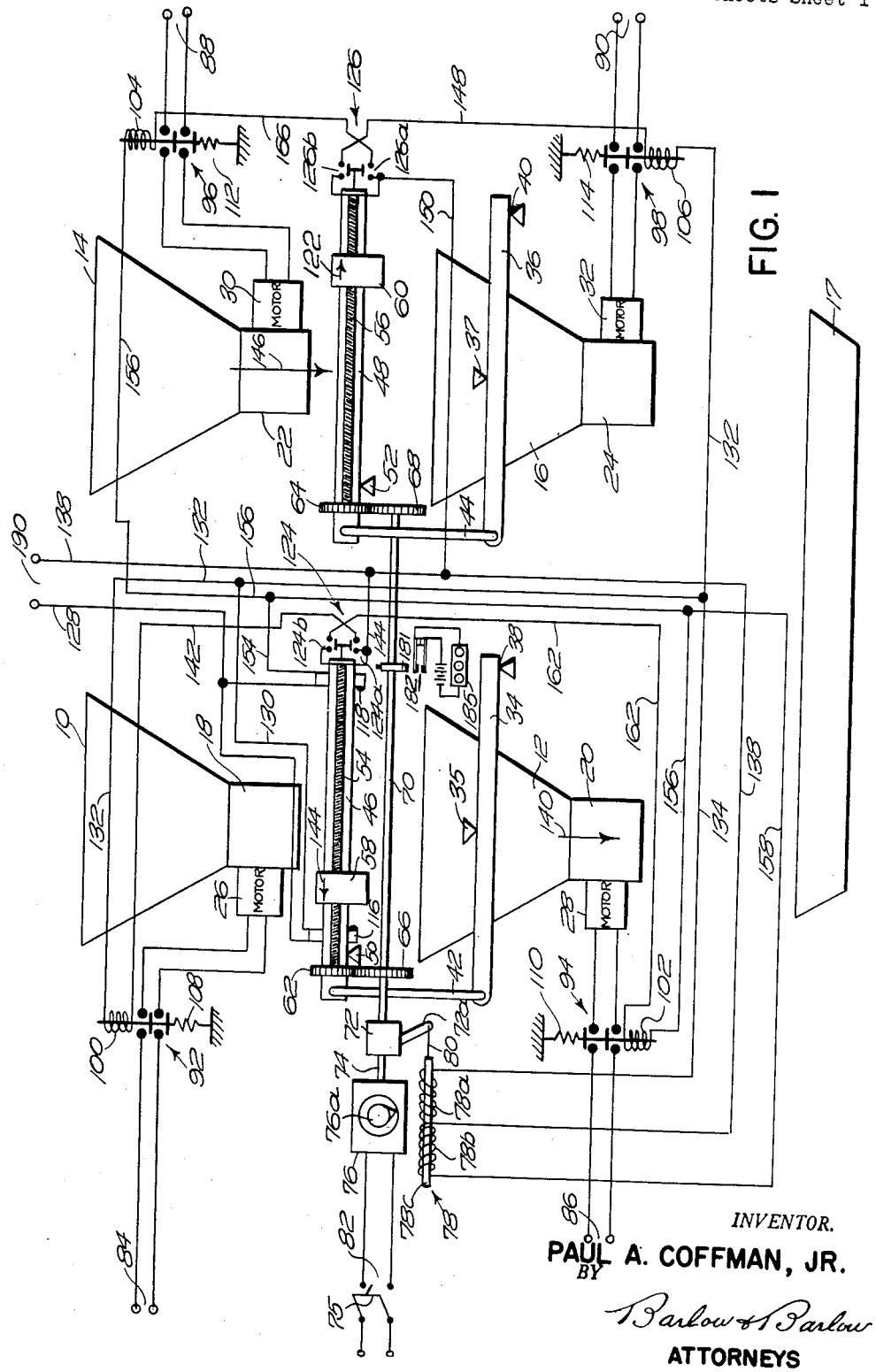
Figure 2:
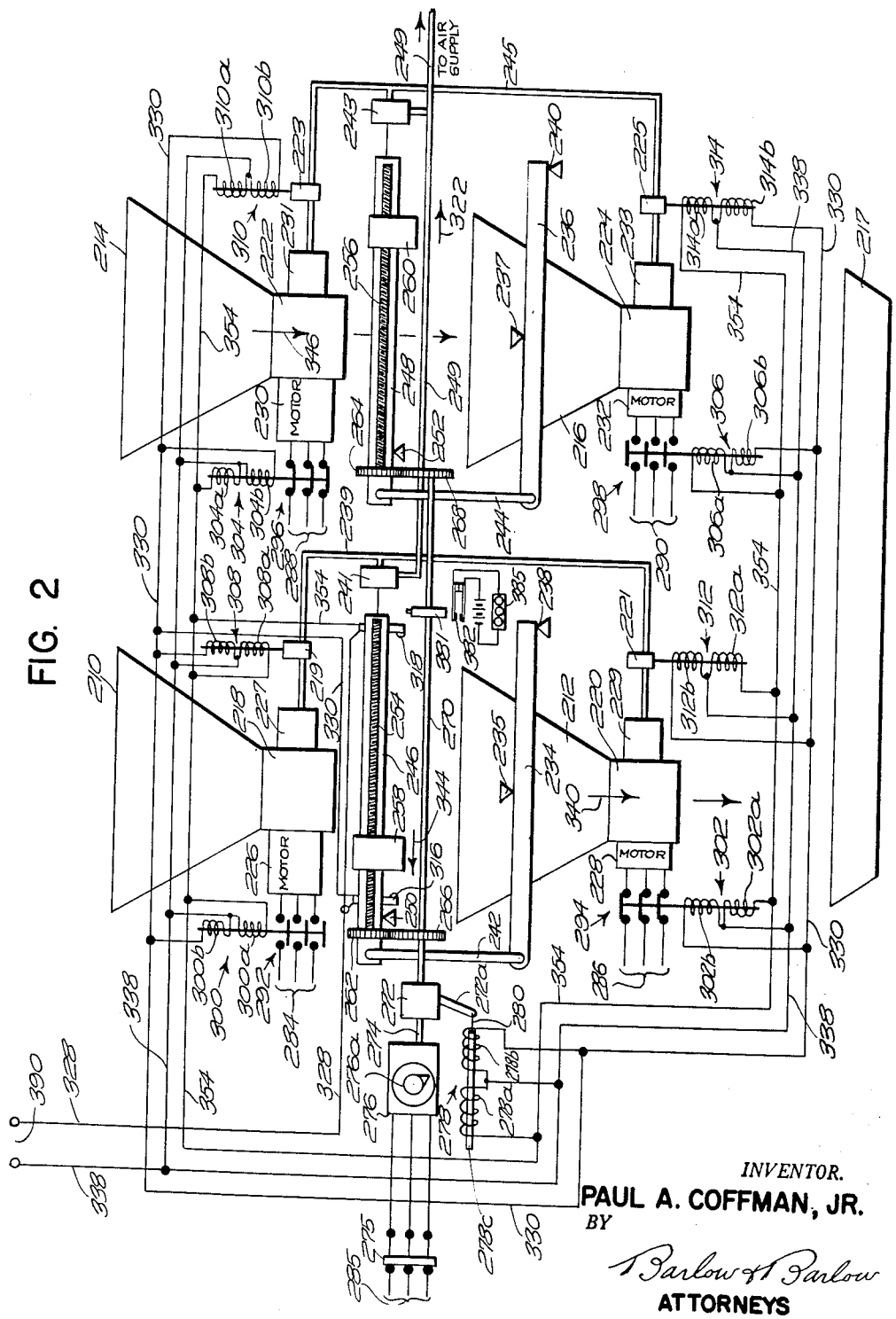
Figure 3:
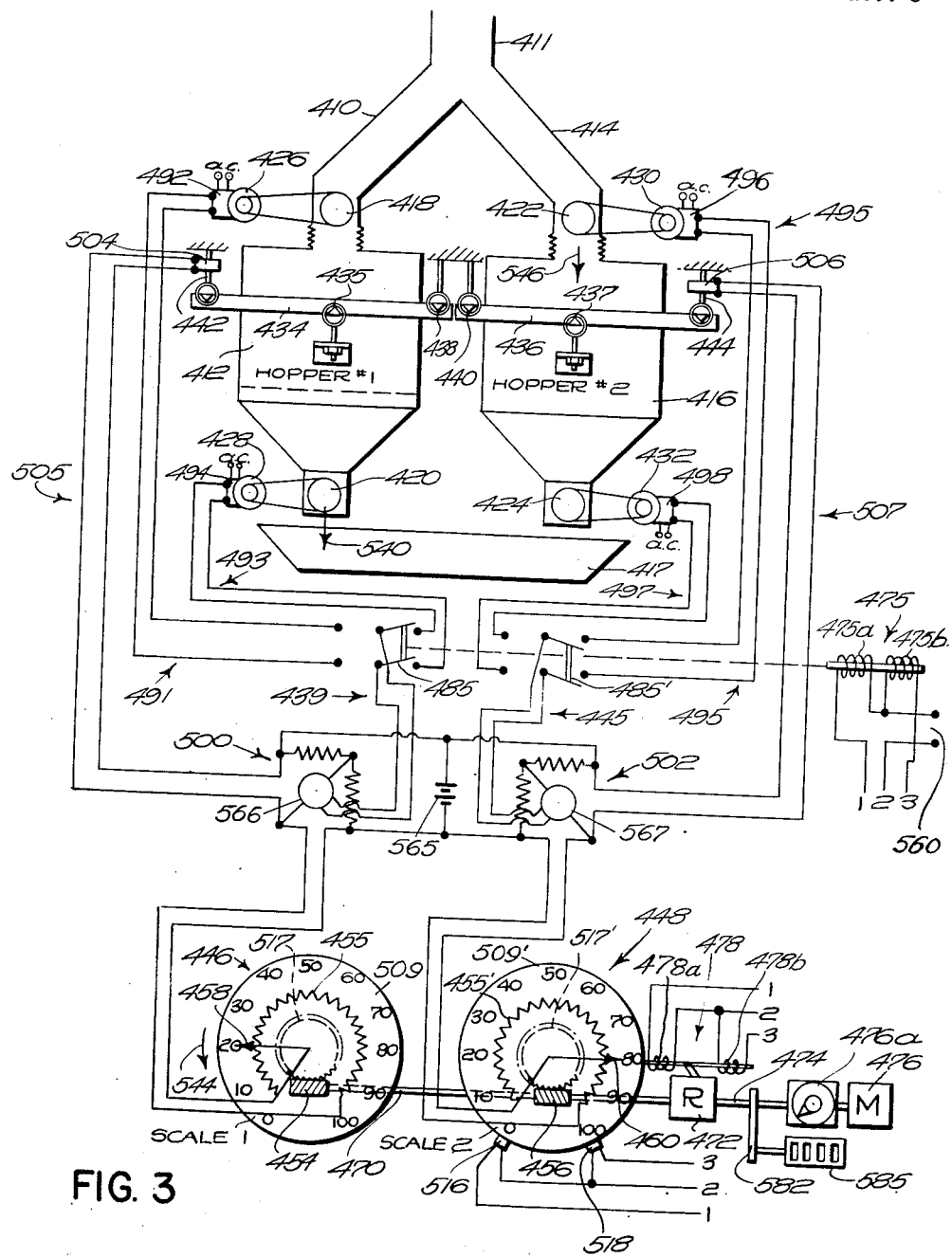
Figure 4:
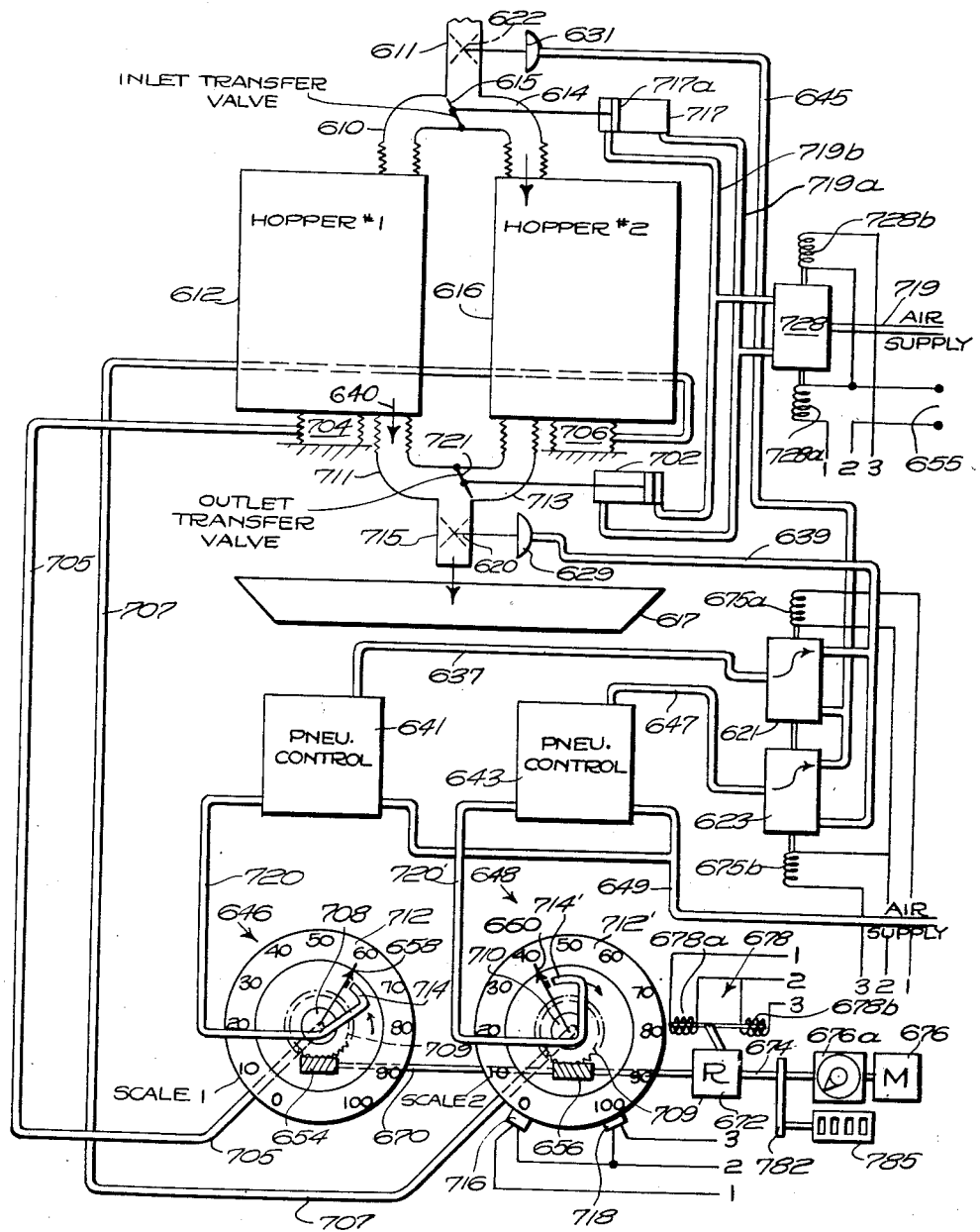

In the accompanying drawings:

Figures 1 and 2 are diagrammatic elevation views showing an embodiment of my invention employing beam balance weighing and electric and pneumatic controls, respectively; and Figures 3 and 4 are diagrammatic elevation views showing an embodiment of my invention employing transducer weighing with electric and pneumatic controls, respectively.

Referring now more particularly to the drawings and particularly to Figure 1, the apparatus therein disclosed is intended primarily for the continuous gravimetrical feeding of dry materials in bulk form. There are four containers—here shown as hoppers 10, 12, 14, and 16—arranged in vertical pairs, the two upper hoppers 10 and 14 delivering into the two lower ones 12 and 16, respectively, and the latter discharging into a common receiver 17 such as a tank or trough, or onto a movable conveyor. The upper hoppers can be supplied from any suitable source, so long as an ample supply is available for the purpose in hand.

At the outlets of all four hoppers are rotary feeders 18, 20, 22, and 24 which are individually driven by constant speed motors 26, 28, 30, and 32, respectively.

The upper hoppers 10 and 14 are fixedly supported, but the lower hoppers 12 and 16 are individually mounted as at 35 and 37 on levers 34 and 36 which are fulcrumed near one end thereof at 38 and 40, respectively. The other end of each lever is connected by a link 42 (44) with a scale beam 46 (48). Each beam is fulcrumed as at 50 (52) near its connection with its respective link, and associated with each scale beam is a lead screw 54 (56) along which a counterpoise weight 58 (60) is moved in one direction or the other according to the rotation of the lead screws. The lead screws may have threads which are reversely disposed so that when they are turned in the same direction the counterpoise weights move in opposite directions with respect to one another, or the lead screws may have similar threads and be rotated in opposite directions.

Each lead screw has a pinion 62 (64) which meshes with a gear 66 (68) on a common shaft 70 which extends from a reversing clutch mechanism 72 connected by a shaft 74 to a variable-speed rate-control motor 76 having a dial 76a for manually adjusting its speed. The shaft 74 is continuously driven by motor 76 in one direction of rotation, but the direction of rotation of the shaft 70 may be the same as that of the shaft 74 or opposite thereto according to the position of the reversing clutch mechanism 72.

The positioning of this clutch mechanism is effected by control means which also determines the action or inaction of the several rotary feeders 18, 20, 22, and 24. Associated with the clutch mechanism 72 is a double acting solenoid 78 having two coils 78a and 78b and an armature 78c, the latter being connected by a link 80 to an arm 72a by which the clutch mechanism 72 can be shifted. When current flows through coil 78a the armature 78c is held in the position shown in the drawing, but when current is cut off from coil 78a and flows through coil 78b, the armature is moved to the left causing the clutch arm 72a to swing clockwise and reverse the clutching mechanism 72. This in turn reverses the direction of rotation of shaft 70 and causes each poise to reverse its direction of movement along its scale beam.

The quantity of material which is discharged is shown by a register actuated by the operating mechanism just described. One form which the register may take is shown in the drawing as a solenoid totalizer 185 actuated by a switch 182 having its circuit closed intermittently by a cam 181 on shaft 70 once every revolution regardless of direction.

Main power circuits 82, 84, 86, 88, and 90, which may be either A. C. or D. C., lead to the several motors 76, 26, 28, 30, and 32, and are provided with double pole switches 75, 92, 94, 96, and 98, respectively. The normally open switches of the four circuits last mentioned are actuated to their closed positions by solenoids 100, 102, 104, and 106 and are held open by springs 108, 110, 112, and 114, respectively, when the solenoids are de-energized while the switch 75 is a manually operated line switch.

Positioned at a location along the beams 46, 48, here shown at the end, are switches 124, 126 which are responsive to the balance of the beams. There are also two limit switches 116 and 118 so positioned with respect to the counterpoise weight 58, movable along the scale beam 46, that as this poise nears one end of its travel, it engages one limit switch device, and near the other end of its travel it engages the other of said limit switch devices. In order to appreciate how these limit switches effect the operation of the complete apparatus, the electrical circuits associated therewith will now be described.

There are two power supply sources in the present invention. A first source, which is illustrated as the single phase type, is used solely for driving the motors associated with the device and connects to the various motor controller switches over leads 82, 84, 86, 88, and 90. A second source 190, which may be either A. C. or D. C. is used solely for energizing the various solenoids and other control devices. The application of power to the several motors 26, 28, 30, and 32 is controlled by two-pole single throw switches 92, 94, 96, and 98, respectively, while the application of power to motor 76 is controlled by a two-pole single throw line switch 75.

The power supply 190 for the control circuits has a first lead 128 which feeds respectively a first terminal of limit switch devices 116 and 118, respectively. The second lead 138 from the power supply 190 acts as a common return and is connected to the common terminal of solenoid 78 and has branch conductors 144 and 150 which connect it to one terminal of contacts 124a, 124b, 126a, and 126b, respectively. The second terminal of contacts 124a and 126a is connected respectively via conductors 142, 166 to one terminal of solenoids 100 and 104, and the second terminals of contacts 124b and 126b, respectively, are connected via conductors 162 and 148 to a first terminal of solenoids 102 and 106, respectively.

Limit switches 116 and 118 are intended generally to reverse the operation of the apparatus and specifically to operate the solenoid 78 and to set up the contacts of switches 124a, 124b, 126a, and 126b so that the proper combination of solenoids 100, 102, 104, and 106 will be actuated thereby. To accomplish this result, the second terminal of limit switch 116 is connected via conductor 130 to branch line 132, the latter being connected to the second terminal of solenoids 100 and 106 and additionally via line 134 to the second terminal of solenoid coil 78a. In a similar manner, the second contact of limit switch 118 is connected via conductor 154 to branch line 156, the latter being connected to the second terminal of solenoids 102 and 104, respectively, and additionally via line 158 to the second terminal of solenoid coil 78b. If limit switch 116 is closed, one side of power supply source 190 as represented by lead 128 will be connected through the limit switch 116 and conductors 130, 132, and 134 to one side of the several solenoids 100, 106, and 78a. In this condition, the coil 78a of solenoid 78 will immediately be actuated as the second side of power source 190 as represented by lead 138 is connected to the common terminal of coil 78a. At the same time, the solenoid coils 100 and 106 will be set up for operation by contacts 124a and 126b, one side of which is connected to the second side of power source 190 as represented by lead 138 over conductors 144 and 150, respectively, the other side of which is connected to the second terminals of solenoid coils 100, 106 over leads 142, and 148, respectively. Conversely, should limit switch 118 be actuated, it will connect one side of power source 190 as represented by lead 128 over conductors 154 and 156 to one terminal of solenoid coils 102 and 104 and additionally over branch line 158 to one terminal of solenoid coil 78b. Solenoid coil 78b will be immediately actuated, since its other common terminal is connected via lead 138 to the other side of the power source 190. At the same time, solenoid coils 102 and 104 will be set up for operation by contacts 124b and 126a, respectively, one side of which is connected to the other side of the power supply source 190 as represented by lead 138 via conductors 150 and 144, the other side of which is connected to the second terminals of solenoid coils 102, 104 over leads 162, 166.

Referring now to Figure 2 wherein like parts have numerals in the 200 series, there are four hoppers 210, 212, 214, 216 that are arranged as in Figure 1 and have rotary feeders 218, 220, 222, and 224. Each feeder is individually driven by motors 226, 228, 230, and 232, respectively, and associated with each motor is a speed control device 227, 229, 231, and 233. The latter are here shown as of the pressure actuated type, the pressure to each being connected thereto or disconnected therefrom by solenoid actuated valves 219, 221, 223, and 225, respectively. Pressure conducting pipes 239 lead to the solenoid valves 219 and 221 from a controller 241, while a similar controller 243 is connected by pipes 245 to the solenoid valves 223 and 225. Each controller 241, 243 is connected to a pipe 249 leading from a suitable supply of pressure (not shown).

The upper hoppers 210 and 214 are fixedly supported, but the lower hoppers 212 and 216 are individually mounted as at 235 and 237 on levers 234 and 236 which are fulcrumed near one end thereof at 238 and 240, respectively. The other end of each lever is connected by a link 242, 244 with a scale beam 246, 248. Each beam is fulcrumed as at 250, 252 near its connection with its respective link, and associated with the beam is a lead screw 254 (256) along which a counterpoise weight 258 (260) is moved in one direction or the other according to the rotation of the lead screws. The lead screws may have threads which are reversely disposed so that when they are turned in the same direction, the counterpoise weights move in opposite directions with respect to one another; or the lead screws may have similar threads and be rotated in opposite directions.

Each lead screw has a pinion 262 (264) which meshes with a gear 266 (268) on a common shaft 270 which extends from a reversing clutch mechanism 272 connected by a shaft 274 to a variable-speed, rate-control motor 276 having a dial 276a for manually adjusting its speed. The latter is continuously driven in one direction of rotation, but the direction of rotation of the shaft 270 may be the same as that of the motor 276 or opposite thereto according to the position of the reversing clutch mechanism 272.

The positioning of the clutch is effected by control means, which also determines the action or inaction of the several rotary feeders 218, 220, 222, and 224 and the positioning of the solenoid valves 219, 221, 223, and 225. Associated with the clutch is a double acting solenoid 273 having two coils 278a and 278b and an armature 278c, the latter being connected by a link 280 to an arm 272a by which the clutch 272 can be shifted. When current flows through coil 278a, the armature 278c is held in the position shown in the drawing, but when the current is cut off from coil 278a and flows through coil 278b, the armature is moved to the right, causing the arm 272a to swing counter clockwise and reverse the clutching mechanism 272.

In the power lines to the motors 226, 228, 230, and 232 are switches 292, 294, 296, and 298, respectively, which are actuated between open and closed positions by double acting solenoids 300, 302, 304, and 306. Each solenoid has two coils suffixed "a" and "b," respectively, and depending upon which coils are energized by flow of current through them, their associated switches are opened or closed.

Similarly, there is associated with each solenoid valve 219, 221, 223, and 225 a double acting solenoid 308, 312, 310, and 314, each having two coils suffixed "a" and "b," respectively. According to which coil is energized the valves are either opened or closed.

There are two limit switch devices 316 and 318 so positioned with respect to the counterpoise weight 258 movable along the scale beam 246 that as the poise nears one end of its travel, it engages one limit switch device, and near the other end of its travel, it engages the other of said limit switch devices. In order to appreciate how these switches effect the operation of the complete apparatus, the electrical circuits associated therewith will now be described.

There are two power supply sources in the present invention. A first source, which is illustrated as the three-phase type, is used solely for driving the motors associated with the device and connects to the various motor controller switches over leads 284, 285, 286, 288, and 290. A second source 390, which may be either A. C. or D. C., is used solely for energizing the various solenoids and other control devices. The application of power to the several motors 226, 228, 230, and 232 is controlled by three-pole single-throw switches 292, 294, and 296 and 298, respectively, while the application of power to motor 276 is controlled by a three pole single-throw line switch 275.

The power supply 390 for the control circuits has a first lead 328 which feeds respectively a first terminal of limit switch devices 316 and 318, respectively. The second lead 338 from the power supply 390 acts as a common return and is connected to the common terminal of solenoids 278, 300, 302, 304, 306, 308, 310, 312, and 314. Limit switches 316 and 318 are intended generally to reverse the operation of the apparatus and specifically to operate the several solenoids above enumerated. If switch 318 is closed, current may then flow from one side of the power source 390 through lead 354 to one side of the several "a" solenoid coils. Conversely, should limit switch 316 be closed, current would flow from one side of the power source 390 through the limit switch and thence along leads 330 to one side of the several "b" solenoid coils. The coils of the various solenoids are so wound that with limit switch 318 closed, switches 292 and 298 and valves 221 and 223 are open while switches 294 and 296 and valves 219 and 225 are closed. Conversely, with limit switch 316 closed, switches 294 and 296 and valves 219 and 225 are open while switches 292 and 298 and valves 221 and 223 are closed.

Referring now to Figure 3 of the drawing wherein like parts have numerals in the 400 series where applicable, there are shown two hoppers 412, 416 that are arranged to discharge into a common receiver or trough 417. The hoppers are supplied from a duct 411 that has two outlets 410 and 414. At the discharge end of these two outlets there are rotary valves 418 and 422 which control the supply of material to the hoppers and are individually driven through suitable drive means by motors 426 and 430, respectively. Also, at the discharge outlets of the two hoppers 412, 416 are rotary valves 420, 424 which are individually driven through suitable drive means, such as a belt, by motors 428, 432, respectively. The motors 426, 428, 430, 432 may be supplied with power at terminals marked A. C., the application of which may be governed through control wiring 491, 493, 495, 497 and by means of a relay or other suitable control 492, 494, 496, 498 that connects to transfer switches 485, 485'. Switch 485 is connected over conductor pairs 439 to the output of a Wheatstone bridge 500, while switch 485' is connected over conductor pairs 445 to a second Wheatstone bridge 502.

The hoppers 412 and 416 are individually mounted as at 435, 437 on levers 434, 436 which are fulcrumed near one end thereof at 438, 440, respectively. The other end of each lever is connected by a suitable means such as a link 442, 444 to an electric transducer 504, 506, such as a strain guage, variable inductance, variable resistance or other suitable weight sensitive device, respectively. The output of these electric transducers are fed over wire pairs 505, 507 to Wheatstone bridges 500 and 502, respectively, to form one leg of the bridge as will be more fully described. Two indicating devices which may be generically called scales are associated with the electric transducers. These scales 446, 448 may take many forms and are here shown diagrammatically as each embodying a fixed disc 509, 509'. On an inner circumference of this disc 509, 509' there may be mounted the stator portion of a rheostat or potentiometer 455, 455'. On a separate means, such as disc 517, 517' which is concentric with the outer disk, there is mounted a movable pointer 458, 460 which also represents the movable arm of the potentiometer, and the disc 517 is mechanically connected to a worm or other suitable drive 454, 456. These worms 454, 456 are mounted on a common shaft 470 which extends from a reversing clutch mechanism 472. This reversing clutch mechanism is in turn connected by a shaft 474 to a variable speed motor 476 having a speed control mechanism 476a. Shaft 474 is, of course, driven in one directon of rotation but the rotation of shaft 470 may be the same as that of the motor or opposite thereto according to the position of the reversing clutch mechanism 472. At each end of the pointer travel of the scale 448, which is shown as approximating 270°, a limit switch 516 and 518 may be placed, the output of these switches terminating in leads numbered 1, 2, 3 for simplicity. It will be understood that the form of the scales is purely diagrammatic, particularly with respect to the variable potentiometer included therein and that any one of the commercially available multi-turn devices may be substituted without departing from the spirit of this disclosure. It will be noted that the worms 454, 456 are shown as having threads reversely disposed one to the other so that when the common shaft 470 turns, the pointers 458, 460 move in opposite directions as was the case with the counterpoises in the previously described embodiments.

The positioning of the clutch 472 and the switches 485, 485' is solely governed by the action of the limit switches 516, 518. To effect a positioning action on the clutch 472, it is provided with a double acting solenoid 478 which has two coils 478a, 478b terminated in leads numbered 1, 2, 3 for identification. Switch 485, 485' is also provided with a double acting solenoid 475 of similar construction, the leads of which are numbered 1, 2, 3 for identification. It will be understood to those skilled in the art that the leads numbered 1, 2, 3 of the solenoids 478 and 475 will be connected together and in turn to the leads of the limit switches 516, 518 identically numbered. Power may be supplied to operate these solenoids by leads 560 which are in effect in series with the leads numbered 2 and will thus complete a circuit to the "a" or the "b" coils of the various solenoids depending upon whether switch 516 or 518 is closed.

The Wheatstone bridges 500 and 502 in this embodiment are intended to control the delivery to and the discharge from the hoppers 412, 416, as the case might be, at a rate which is set by the speed controller 476a. They are shown as consisting of four legs, one leg of which is connected to the electric transducer, the second leg of which is connected to the variable rheostat 455, and the third and fourth legs which consist of fixed reference resistors. A suitable source of voltage such as battery 565 is connected across one diagonal of the bridges and the outputs of the other diagonal are connected to leads 439, 445 through relays 566, 567. The output of the Wheatstone bridge which is associated with the hopper being filled is supplied through switch 485 or 485' over conductor pairs 491 or 495 to the relay 492 or 496, while the output of the Wheatstone bridge associated with the hopper being emptied is connected through the transfer switch 485, 485', thence over conductor pairs 493 or 497 to relay 494 or 498. Unbalance in the Wheatstone bridge associated with the hopper being filled, which will be initiated by the constantly varying rheostat 455, 455', will be transmitted to the control device 492 or 496 which will operate the rotary feeder associated therewith. Similarly an unbalance will be introduced in the Wheatstone bridge of the hopper being discharged through the rheostat 455, 455', and this will be transmitted to the relay 494 or 498 and operate the rotary feeder of the hopper being emptied. Operation of the inlet feeder 418, 422 will add material to the hopper being filled and the increased weight thereof will be sensed by the transducer 504, 506 to restore balance in the Wheatstone bridge 500, 502. Thereupon the relay 492, 496 will be deenergized and its feeder 418, 422 will stop until a subsequent unbalance in the bridge 500, 502 occurs. Similarly, operation of the discharge feeder 420, 424 will decrease the weight of hopper being emptied, and the decreased weight thereof will rebalance the bridge 500, 502.

Referring now to Figure 4 of the drawing wherein like parts have reference numerals in the 600 series where applicable, there are shown two hoppers 612, 616 arranged to discharge into a common receiver 617. These hoppers are supplied from a duct 611 having two outlets 610, 614 with a transfer gate 615 at the junction thereof, which is operated by an air cylinder 717 and determines which hopper receives the material delivered to the apparatus by duct 611. A two-way solenoid valve 728 is supplied with air through pipe 719 and is actuated by solenoid coils 728a, 728b to supply air alternately through pipes 719a or 719b to actuate the piston 717a of air cylinder 717.

The discharge of the two hoppers into the trough 617 is effected through a duct 715 which has two inlets thereto 711, 713 from the hoppers 612 and 616, respectively. A transfer gate 721 is interposed in this outlet duct which is operated by an air cylinder 702 to determine which hopper will discharge into the trough 617. This air cylinder 702 is fed in parallel with the air cylinder 717 and is thus connected to the pipes 719a and 719b.

In the discharge duct 715 there is positioned a control valve 620 which is positioned by a diaphragm 629. A pressure conducting pipe 639 carries pressure to the diaphragm 629 from a two-way valve 621, 623 actuated by solenoid coils 675a, 675b. In the supply duct 611 there is also positioned a control valve 622 positioned by a diaphragm 631. A pipe 645 leads to this diaphragm and carries pressure from the valves 621, 623. The two-way transfer valves 621, 623 are connected, respectively, via pipes 637, 647 to pneumatic controllers 641, 643 of a type such as Model ACH-1 manufactured by B-I-F Industries, Inc., and shown in their bulletin 285-M41. These controllers are in turn supplied with air pressure over pipe 649. It will be apparent that the controller 641, 643 may be connected either to the outlet valve 620 or the inlet valve 622, as the case might be, depending upon the position of the solenoid valves 621, 623.

The hoppers 612, 616 are individually mounted on a pneumatic transducer 704, 706, respectively. The output of these transducers is fed via pipes 705, 707, respectively, to a pneumatic responsive device 708, 710, respectively, which fundamentally are pressure gauges having pointers 658, 660. As was the case of the embodiment shown in Figure 3, the pointers are part of what might be generically termed a scale means 646, 648 having indicia means shown as fixed outer discs 712, 712'. Co-axial with and intermediate the pneumatic responsive devices 708, 710 and the indicia means 712, 712' are rotatable discs 709, 709' which have affixed thereto air nozzles 714, 714'. The air nozzles are mounted so that they direct air toward abutments on the pointers and are supplied with air from controllers 641, 643 through rotatable joints in pipes 720, 720', respectively. The nozzles so located establish a finite pressure in pipes 720, 720' that is dependent upon the spacing of the nozzle and the abutment. As the spacing varies, the pressure in the pipes 720, 720' will vary from the reference position initially established, and the controllers 641, 643 will in turn transmit this variation in pipes 637, 647, respectively, which are connected either to diaphragm 629 of valve 620 or to diaphragm 631 of valve 622. Worm gears 654, 656 are fixed to a common shaft 670 and rotate the discs 709, 709'. The worm gears have threads that are reversely disposed so that when they turn in the same direction, the disks 709, 709' will rotate in opposite directions. The common shaft 670 extends to a reversing clutch mechanism 672 which is connected by a shaft 674 to the speed control device 676a and in turn to the motor 676. The latter is continuously driven in one direction of rotation, but the direction of rotation of the shaft 670 may be the same as that of the motor or opposite thereto according to the position of reversing clutch mechanism 672. At each end of the pointer travel of the scale 648, a limit switch 716, 718 is placed, the output of these switches terminating in leads numbered 1, 2, 3.

The positioning of the clutch 672 is effected by a double acting solenoid 678 having two coils 678a and 678b terminating in leads 1, 2, 3. The actuation of clutch 672, valves 621, 623 and 728 is governed by limit switches 716, 718 and to that end it will be understood by those skilled in the art that the leads 1, 2, 3 are connected together, power being supplied at 655, which terminals are in series with lead number 2. Thus, when switch 716 is closed, a circuit will be completed to all the "a" coils of the various solenoids, and when the switch 718 is closed, a circuit will be completed to all the "b" coils.

In order to appreciate how the various controls, electric and pneumatic, and power circuits operate in the embodiments described above, the operation of the devices will now be discussed.

As shown in each of the figures, material is being delivered into the 16 hoppers through the control of suitable valve means which in Figures 1, 2 and 3 take the form of rotary valves 22, 222, 422 and in Figure 4 takes the form of a diaphragm controlled valve 622. Simultaneously material is being discharged from the 12 hoppers, this discharge being under suitable control such as rotary valves 20, 220, 420 or diaphragm controlled valve 620. The shafts 70 and 270 are being rotated in a direction to cause the poises 58 and 258 to move to the left as indicated by the arrows 144, 344, while the poises 60 and 260 are being moved to the right as indicated by the arrows 122 and 322. Likewise, in Figure 3 the pointer 458 will be rotating in a counter-clockwise direction, while the pointer 460 will be rotating in a clockwise direction, and in Figure 4 the nozzle 714 will be rotating in a counter-clockwise direction and the outlet 714' will be rotating in a clockwise direction. The above actions will continue until the limit switches 116, 316, 518, 718 are engaged.

Let us assume in Figures 1 and 2 that the moment of poises 58, 258 effective on the scale beams 46, 246 is just balanced by the combined weights of the hoppers 12, 212 and the material therein so that the scale beams 46 are horizontal. Also assume that at the same instant the moment of poises 60, 260 effective on the scale beams 48, 248 is just balanced by the combined weights of hoppers 16, 216 and the material therein so that the scale beams 48, 248 are likewise horizontal. Also assume in connection with Figures 3 and 4 that the Wheatstone bridges 500, 502 are balanced and that the position of the pointers 658, 660 with reference to the nozzles 714, 714' are at their reference positions. Under the influence of the shafts 70, 270, the poises 58, 258 will move to the left and decrease the moment on the scale beams 46, 246. Likewise the pointer 458 will rotate to decrease the resistance in one leg of the bridge circuit 500 and the nozzle 714 will move closer to the pointer 658. These actions in effect upset the balance of the device, which is not balanced by corresponding decrease in the weights of the "12" hoppers and the material therein. In order to rebalance the system, material must be discharged from the "12" hoppers, and this is effected through the control means connected with the scales. For instance, in Figure 1 the decrease in moment will cause the scale beam 46 to tilt upwardly from the horizontal to close contacts 124b and thus energize the solenoid 102, closing switch 94, to operate rotary feeder 20, which will discharge additional material from the hopper 12. In Figures 2 and 4 a similar action takes place through the controllers 241, 641, which respectively actuate the valves 220, 620 to increase the speed of discharge. In Figure 3 the unbalance set up in the bridge 500 will have run the motor 428 and its associated feeder 420.

Similarly, but reversely, as material is being delivered into the "16" hoppers, the poises 60, 260 are being moved to the right in Figures 1 and 2, the pointer 460 is rotating clockwise in Figure 3, and the nozzle 714' is rotating clockwise in Figure 4. The increasing moment of the scale beams of Figures 1 and 2 and the unbalance created by the increase in resistance of one leg of the bridge 502 in Figure 3 and the decrease in pressure transmitted to the controller 643 in Figure 4 must be compensated for by delivery of additional material to the "16" hoppers. Thus, in Figure 1 contacts 126a will close, in Figure 2 controller 243 will be actuated, in Figure 3 relay 496 will be energized, and in Figure 4 valve 622 will be opened, each thereby acting to deliver more material to the "16" hoppers. In due course, the limit switch devices 116, 316, 518, 718 are engaged, and the delivery to the "16" hoppers is stopped, the discharge from the "12" hoppers is stopped, the discharge from the "16" hoppers is started, and the delivery to the "12" hoppers is started.

Assuming now that the "12" hoppers have been filled, then upon the closing of the limit switch devices 116, 316, 518, 718, the following sequence of operations takes place in the various figures. In Figure 1 the solenoids 104 and 102 are made active in the scale beam switching circuit and the solenoid 78b is energized, thereby reversing the direction of rotation of the shaft 70 and placing the clutch 72 in the position shown in the drawing. In Figure 2 all the "a" coils of the various solenoids are energized, which reverses the direction of rotation of the shaft 270 as well as connects the scale beam controllers to the feeder controllers in the proper sequence and also energizes the proper feeder motors, namely controllers 231 and 229 and motors 230 and 228. In Figures 3 and 4 the leads 2 and 3 will be energized, thereby closing all the "b" coils of the various solenoids to secure the proper direction of rotation of the shafts 470 and 670 by operation of the reversing mechanism 472 and 672 and also the transfer control means to establish control to the proper feeders as indicated in the drawings. When the "12" hoppers become empty and the "16" hoppers fill, the limit switch device 116 is engaged in Figure 1, a circuit is established to solenoids 100 and 106 which can be closed through the scale beam switches and the solenoid coil 78a is energized, reversing the rotation of the shaft 70. In Figure 2 all the "b" coils of the various solenoids will be energized, reversing the rotation of the shaft 270 and setting up the proper valve and circuit conditions to the feeders to obtain a reversal of operation. In Figures 3 and 4 the leads 1 and 2 will be energized, thus operating the "a" coils of the reversing mechanism and the control switching mechanism to establish control to the proper set of feeders. The described cycles can continue indefinitely as long as there is a supply of material to be delivered to the delivery feeders.

It should be kept in mind that there are illustrated herein two types of feeding devices, a start-stop type and a modulating type, the former being embodied in Figures 1 and 3. Thus, in Figures 1 and 3 the speed of the feeder motors is chosen so that the feeder that it is driving will deliver or discharge, as the case might be, at a rate so that the decreasing moment of the hopper is faster than the corresponding decreasing moment of the receding counterpoise with a reverse condition being existent in the hopper being delivered to. This will cause the scale beam to tilt and provide a start-stop action to allow the moment of the scale beam to catch up to the discharge from the hopper. In the modulating type of control of Figures 2 and 4, the rate of discharge or delivery to the hoppers is regulated by varying the speed of the rotary valves under control of the scale beams or scale sensitive mechanism as described. The quantity of the material which is discharged through this mechanism may be registered in any number of ways, and I have shown herein a simple totalizer such as 185, 385, 585, and 785. This totalizer is responsive to the number of revolutions of the shafts 70 and 270 and in Figures 1 and 2 is shown particularly as a solenoid operated totalizer that is operated by a switch such as 182 or 382 that has its circuit closed intermittently by a cam 181 or 381 mounted on the shaft 70 or 270 once every revolution regardless of direction. In Figures 3 and 4 there is illustrated for example a mechanically driven totalizer which is mounted ahead of the reversing mechanism on the shaft 474 or 674 and similarly will register through this drive mechanism 582 or 782 the number of revolutions of the shaft 470 or 670 regardless of direction. For some applications it has been found that the valves 219, 221, 223, and 225 in Figure 2 along with their respective solenoids may be omitted. These valves have been included primarily to prevent the actuation of the speed controllers associated with the feeders which are inactive during a particular cycle.

Some feeders which are well adapted for use in my device will actually discharge small quantities when their motors are shut off as the associated speed controllers are actuated in step with the feed controllers then being driven. This is undesirable because it tends to cancel out the adjustment being made in the feeders being driven, and the balance of the scale beams is not so well maintained. However, where maximum control of the instantaneous rate of discharge is not essential, the solenoid valves may be omitted. Furthermore, there are also types of feeders available which when their motors are shut off do not advance or discharge even slightly under actuation of their speed controllers. It will thus be understood that if the last mentioned feeders are used in my device, the solenoid valves above referred to are unnecessary and may be omitted together with their respective solenoids, thus greatly simplifying the device. It will also be apparent that I have shown a rather simplified type of pneumatic control in Figure 4 of the drawings, which eliminates some of the mechanism and complexity of the similar device of Figure 2, the number of parts being reduced by a considerable factor. It should thus be understood that the claims appended hereto are to be taken and construed to encompass suitable modification of the basic device disclosed and claimed herein and utilizing the teachings of mechanical embodiment from one field to the other.

I claim:

1. Continuous feeding apparatus comprising two containers, a supply source for said containers, delivery control means between said supply source and said containers to supply alternately one container at a time, a weighing device coupled to each of said containers, a discharge duct leading from said containers, second valve means in said discharge duct, means independent of said containers coupled to said weight indicating means for imparting a progressive unbalance at a constant rate thereto, and control means coupled to the weight indicating means responsive to the balance thereof and the first and second valve means to control the material supply to and discharge from said containers at a rate determined by the rate of progressive unbalance imparted to said weight indicating means and second means responsive to a predetermined total weight in the container being filled to transfer the supply to the container that has been discharging and discharge the now filled container, this transfer being reversed when the now filling container receives a predetermined weight of material.

2. An apparatus as in claim 1 wherein the weighing device comprises a beam balance and counterpoise and the means to impart a progressive unbalance comprises a means to automatically more the counterpoise at a predetermined rate.

3. An apparatus as in claim 2 wherein control means includes a supply of pneumatic pressure connected to said first and second valve means, a first controller between said supply of pressure and said first valve means coupled to one beam balance, and a second controller between said supply of pressure and said second valve means coupled to the other beam balance.

4. An apparatus as in claim 1 wherein the weighing device includes an electric transducer coupled to a differential indicating circuit and the means to impart a progressive unbalance comprises a variable electric element also coupled to said circuit, said element being varied at a predetermined rate.

5. An apparatus as in claim 1 wherein the weighing device includes a pneumatic transducer sensing element.

6. Continuous feeding apparatus comprising two containers, a supply source for said containers, valve means between said supply source and said containers to supply alternately one container at a time, a pair of beam balances, each of said containers mounted on a separate beam balance, a counterpoise on each beam balance having common means coupled thereto for movement at a constant rate along each beam balance, a discharge duct leading from said containers, second valve means in said discharge duct, control means on one beam balance responsive to the balance thereof for controlling said first valve means, and second control means on the other beam balance responsive to the balance thereof for controlling said second valve means to supply material to one container and discharge material to the other container at rates determined by the advance of said counterpoise along said beam balances and second means responsive to a predetermined total weight in the container being filled to transfer the supply to the container that has been discharging and discharge the now filled container, this transfer being reversed when the now filling container receives a predetermined weight of material.

7. Continuous feeding apparatus comprising two containers, a supply source for said containers, delivery control means between said supply source and said containers to supply alternately one container at a time, weight indicating means coupled to each of said containers, a discharge duct leading from said containers, valve means in said discharge duct, means coupled to said weight indicating means for imparting a progressive unbalance thereof, and control means including a source of electrical energy coupled to said delivery control means and valve means, a first switch in circuit between said source and delivery control means, a second switch in circuit between said source and second valve means, said first switch coupled to one weight indicating means, said second switch coupled to the other weight indicating means to control the supply and discharge of material to and from said containers at a rate determined by the rate of progressive unbalance imparted to said weight indicating means and second means responsive to a predetermined total weight in the container being filled to transfer the supply to the container that has been discharging and discharge the now filled container, this transfer being reversed when the now filling container receives a predetermined weight of material.

8. An apparatus as in claim 7 wherein the means indicating the weight comprises a beam balance and the means to impart a progressive unbalance comprises a counterpoise on the beam balance automatically moved at a predetermined rate.

9. Continuous feeding apparatus comprising two containers, a supply source for said containers, valve means between said supply source and said containers to supply alternately one container at a time, a pair of beam balances, each of said containers mounted on a separate beam balance, a counterpoise on each beam balance having common means coupled thereto for movement at a constant rate along each beam balance, a discharge duct leading from said containers, a second valve means in said discharge duct, a source of electrical energy coupled to said valve means, a first switch in circuit with the source of electrical energy and said first valve means, said first switch mechanically coupled to one beam balance and responsive to the balance thereof for controlling said first valve means, a second switch in circuit with the source of electrical energy and said second valve means, said second switch mechanically coupled to the other beam balance and responsive to the balance thereof for controlling said second valve means so that material will be supplied to one container and discharged from the other container at rates determined by the advance of said counterpoise along said beam balances and second means responsive to a predetermined total weight in the container being filled to transfer the supply to the container that has been discharging and discharge the now filled container, this transfer being reversed when the now filling container receives a predetermined weight of material.

10. Continuous feeding apparatus comprising two pairs of containers, each pair having two containers arranged so that one delivers material into the other, each receiving container coupled to a separate beam balance, each beam balance having a counterpoise, said counterpoises coupled to a constant speed driving mechanism, discharge valve means having pneumatic control on each container for discharging material, a first pneumatic controller in a pneumatic line connected between a supply and said valve means on one pair of containers, said first controller having means coupled to and responsive to the balance of the beam coupled to the receiving container of the pair, a second pneumatic controller in a pneumatic line connected between a supply and said valve means on the second pair of containers, said second controller having means coupled to and responsive to the balance of the beam coupled to the receiving container of the pair, means to energize the discharge valves of the delivery container of one pair and the receiving container of the other pair and render them responsive to their respective pneumatic valves to feed material at a rate in accordance with the rate of travel of said counterpoises and electrical control means positioned near the end of travel of one of the counterpoises to shift the energization of discharge valves to the delivery and receiving containers of the other pairs and at the same time reverse the travel of said counterpoises, this shift being reversed when the now filling lower container receives a predetermined weight of material.

11. An apparatus as in claim 10 wherein a shut-off valve is positioned in the pneumatic line adjacent the discharge valve means on each container, said shut-off valves being responsive to the electrical control means positioned near the end of travel of the counterpoises to open the pneumatic line to the energized discharge valves.

12. Apparatus as in claim 11 wherein counter means are provided to register the number of revolutions of the drive mechanism.

13. A continuous feeding apparatus comprising two pairs of containers, each pair having two containers arranged so that one delivers material into the other, each receiving container coupled to a separate beam balance, each beam balance having a counterpoise, said counterpoises coupled to a constant speed driving mechanism, discharge valve means having electrical control including a solenoid operated switch on each container for discharging material, a switch connected in circuit between a source of voltage and the solenoid operated switches on one pair of containers, said switch being coupled to and responsive to the balance of the beam coupled to the receiving container of said pair, a second switch connected in circuit to a source of voltage and the solenoid operated switches on the second pair of containers, said second switch being coupled to and responsive to the balance of the beam coupled to the receiving container of said pair, means to energize the discharge valves of the delivering container of one pair and the receiving container of the other pair and render them responsive to their respective electrical control means to feed material at a rate in accordance with the rate of travel of said counterpoises and an electrical stop switch positioned near the end of travel of one of the counterpoises to shift the energization of discharge valves to the delivering and receiving container of the other pairs and at the same time reverse the travel of said counterpoises, this shift being reversed when the now filling container receives a predetermined weight of material.

14. Apparatus as in claim 13 wherein counter means are provided to register the number of revolutions of the drive mechanism.

15. A continuous feeding apparatus comprising at least two containers, each container coupled to a weighing device including an electric transducer, a supply of material, first valve means having electrical control between said supply and said containers to supply alternately one container at a time, second valve means coupled to said containers for discharging material therefrom, a bridge circuit for each transducer, the output of each of said transducers coupled to its bridge circuit, the output of the bridge circuit associated with the container being filled coupled to the first valve means, the output of the bridge circuit associated with the discharging container coupled to the second valve means, a variable element in each bridge circuit, means to vary said elements in an inverse ratio and at the same rate so that material will be supplied to one container at the same rate material is discharged from the other container and limit means associated with one of said variable elements responsive to a predetermined total weight in the container being filled to shift the supply and discharge from one container to the other, this shift being reversed when the now filling container receives a predetermined weight of material.

16. A continuous feeding apparatus comprising at least two containers, each container coupled to a weighing device including a pneumatic transducer, a supply of material, first valve means having pneumatic control between said supply and said containers, second valve means coupled to said containers for discharging material therefrom, weight indicating means including a movable arm connected to each pneumatic transducer, a source of air pressure, a pneumatic controller for each container, said source connected through each pneumatic controller to separate outlets mounted on movable means mechanically coupled together adjacent each arm, said pneumatic controllers responsive to pressure variations at said outlets, one controller being associated with the filling container and having its output coupled to the first valve means, means including a pipe connecting the pneumatic controller associated with the discharging container to said second valve means, means to move said outlets relative to said arms at a constant rate whereby material will be supplied to one container at the same rate material is discharged from the other container and limit means associated with one of said movable means to shift the supply and discharge from one container to the other the shift being reversed when the now filling container receives a predetermined amount of material.

17. In a continuous feeding apparatus, two containers, a supply source for said containers, delivery control means between said supply source and said containers to supply alternately one container at a time, a weighing device coupled to each of said containers, a discharge duct leading from said containers, second valve means in said discharge duct, means independent of said containers coupled to said weight indicating means for imparting a progressive unbalance at a constant rate thereto, and control means coupled to the weight indicating means responsive to the balance thereof and the first and second valve means to control the material supply to and discharge from said containers at a rate determined by the rate of progressive unbalance imparted to said weight indicating means and second means responsive to a predetermined total weight in the container being filled to transfer the supply to the container that has been discharging and discharge the now filled container, this transfer being reversed when the now filling container receives a predetermined weight of material.

References Cited in the file of this patent

UNITED STATES PATENTS

| | | |
|---|---|---|
| 308,322 | Moyers | Nov. 18, 1884 |
| 593,455 | Braun | Nov. 9, 1897 |
| 1,175,573 | Weyant | Mar. 14, 1916 |
| 1,527,633 | Debay | Feb. 24, 1925 |
| 2,072,326 | Forster | Mar. 2, 1937 |
| 2,134,669 | Page | Oct. 25, 1938 |